United States Patent
Yamatsu et al.

(10) Patent No.: US 8,171,484 B2
(45) Date of Patent: May 1, 2012

(54) RESOURCE MANAGEMENT APPARATUS AND RADIO NETWORK CONTROLLER

(75) Inventors: Katsuhiko Yamatsu, Fukuoka (JP);
Hidetada Tanaka, Fukuoka (JP);
Kazuaki Sumi, Fukuoka (JP);
Nobuyuki Shima, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 11/877,802

(22) Filed: Oct. 24, 2007

(65) Prior Publication Data

US 2008/0120621 A1    May 22, 2008

(30) Foreign Application Priority Data

Nov. 17, 2006  (JP) ................. 2006-311805
Aug. 10, 2007  (JP) ................. 2007-209832

(51) Int. Cl.
*G06F 9/46* (2006.01)

(52) U.S. Cl. ........ 718/104; 718/103; 711/170; 711/171; 711/172; 711/173; 712/214; 712/215; 715/804; 715/805

(58) Field of Classification Search ............ None
See application file for complete search history.

(56) References Cited

U.S. PATENT DOCUMENTS

| | | | |
|---|---|---|---|
| 6,006,248 A * | 12/1999 | Nagae ................ | 718/105 |
| 7,203,944 B1 * | 4/2007 | van Rietschote et al. ..... | 718/104 |
| 2002/0087611 A1 * | 7/2002 | Tanaka et al. ............. | 709/1 |
| 2003/0189930 A1 | 10/2003 | Terrell et al. | |
| 2005/0120160 A1 | 6/2005 | Plouffe et al. | |
| 2005/0192969 A1 * | 9/2005 | Haga et al. .................. | 707/10 |
| 2005/0198636 A1 | 9/2005 | Barsness et al. | |
| 2005/0235288 A1 * | 10/2005 | Yamakabe et al. ........... | 718/100 |
| 2006/0242442 A1 | 10/2006 | Armstrong et al. | |

FOREIGN PATENT DOCUMENTS

| | | |
|---|---|---|
| EP | 1 376 353 | 1/2004 |
| JP | 2004-318474 | 11/2004 |
| JP | 2005-182697 | 7/2005 |
| WO | 2004/028181 | 4/2004 |

OTHER PUBLICATIONS

European Search Report dated Sep. 7, 2009, from the corresponding European Application.
Jim Basney, et al. "Utilizing Widely Distributed Computational Resources Efficiently with Execution Domains" Computer Physics Communication, Elsevier Science Publishers B.V., vol. 140, No. 1/02, Oct. 1, 2001, pp. 246-252.
Sven Graupner, et al. "Adaptive Control System for Server Groups in Enterprise Data Centers" IEEE International Symposium on Cluster Computing and the Grid, Apr. 19, 2004, pp. 736-743.

* cited by examiner

*Primary Examiner* — Emerson Puente
*Assistant Examiner* — Sisley Kim
(74) *Attorney, Agent, or Firm* — Fujitsu Patent Center

(57) ABSTRACT

A resource management apparatus includes a resource management part to manage an amount of resources used and an amount of virtual resources of each of a plurality of processing units, a selection and control part to select a processing unit having a smallest sum of the amount of resources used and the amount of virtual resources in response to an external process request, and to increase the amount of resources used by the selected processing unit and to decrease the amount of resources used by a processing unit corresponding to an external process release request in response to the process release request, a virtual resource control part to increase the amount of virtual resources of the processing unit corresponding to the process release request in response to the process release request, and a request sending part to send the external process request or process release request to the selected or corresponding processing unit.

7 Claims, 15 Drawing Sheets

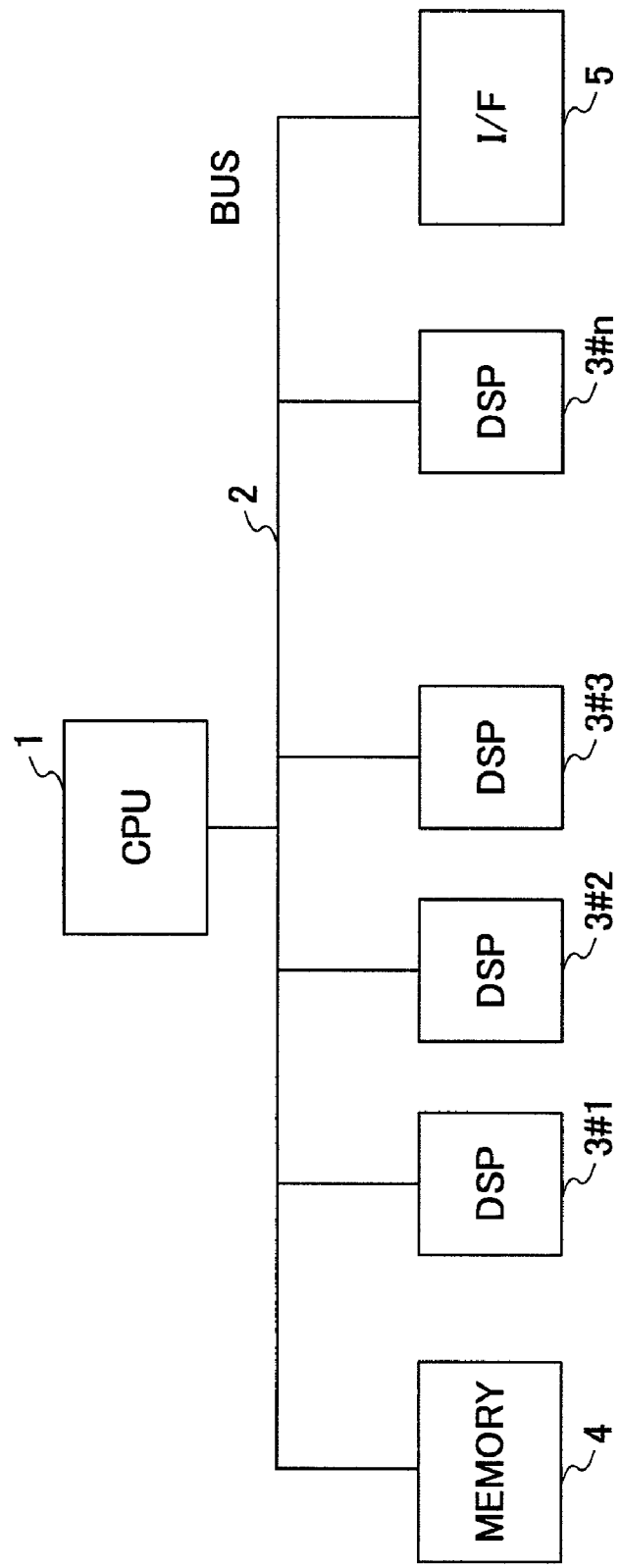

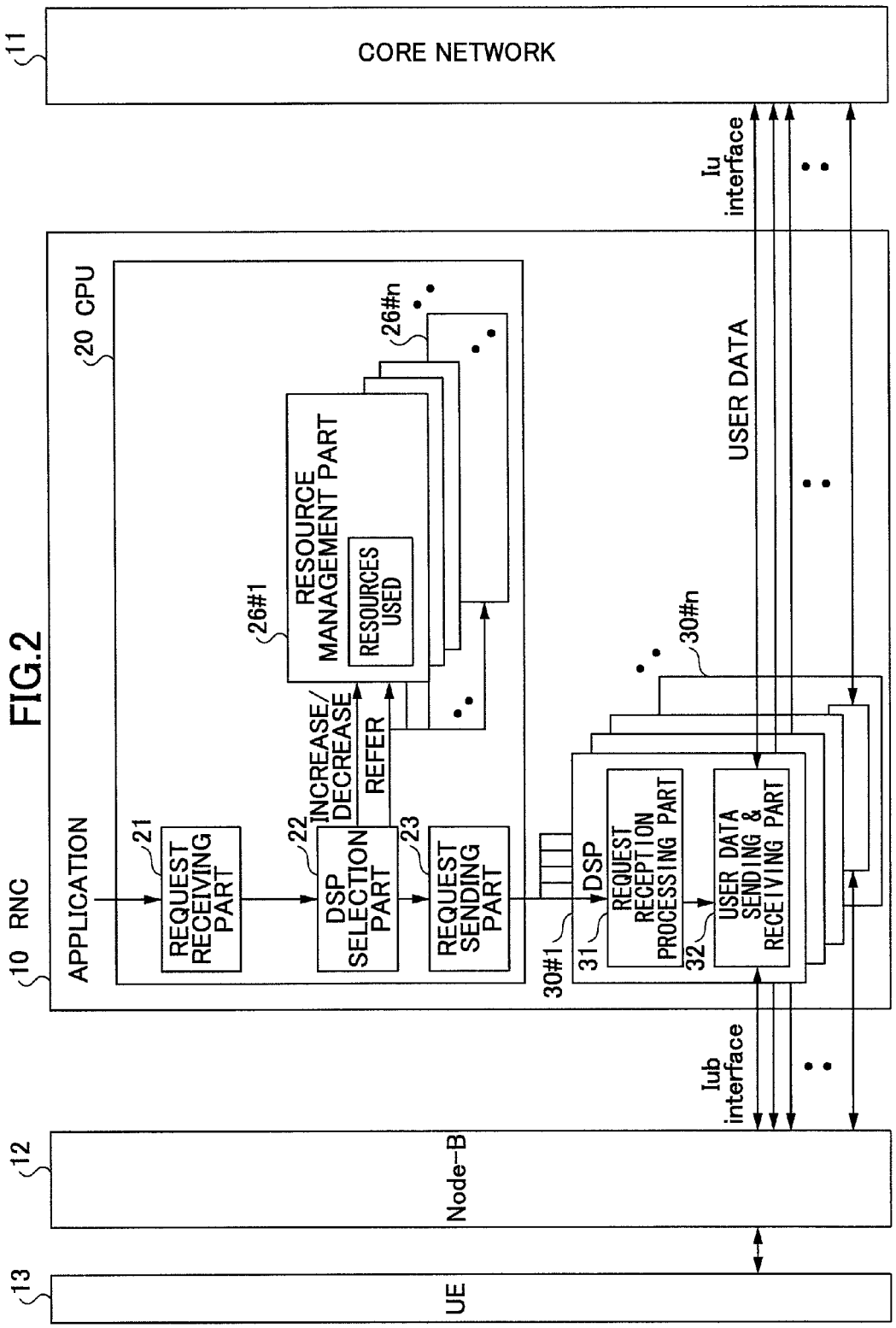

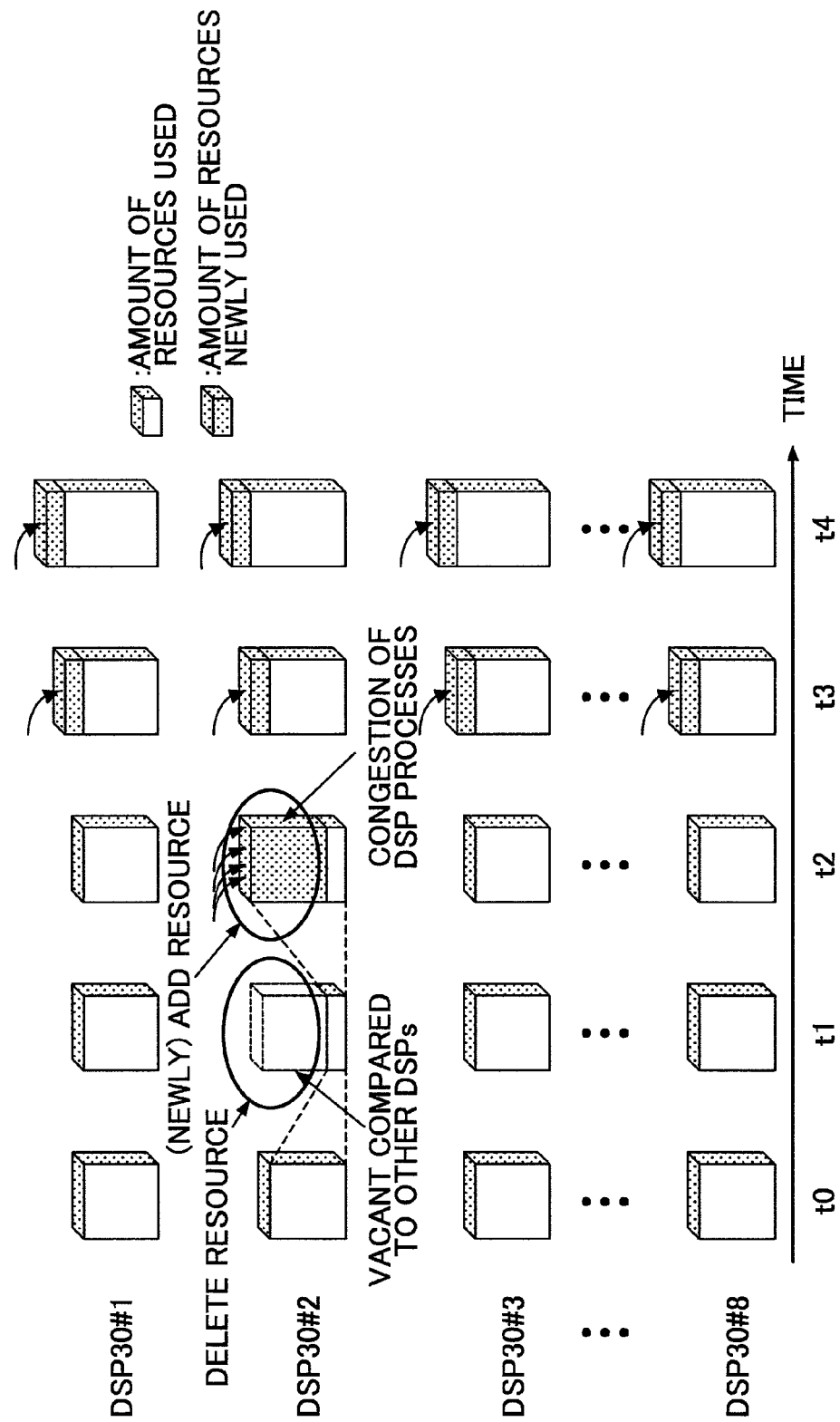

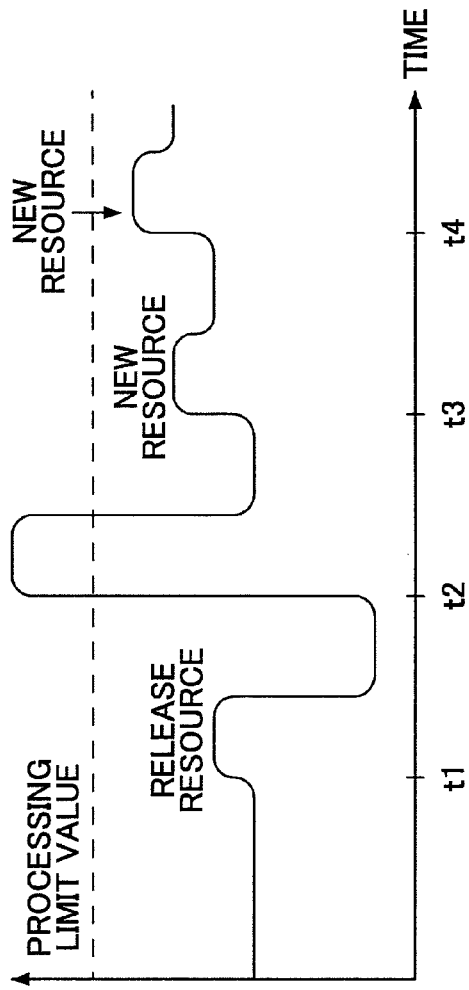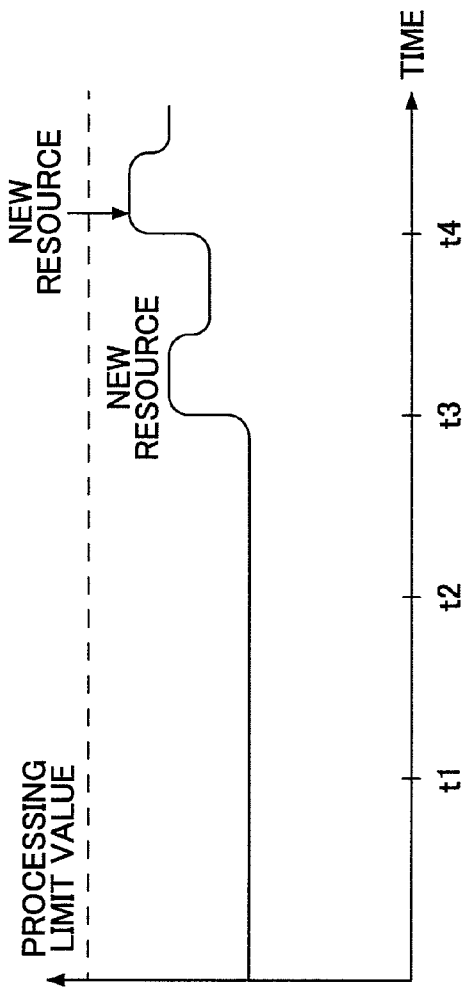

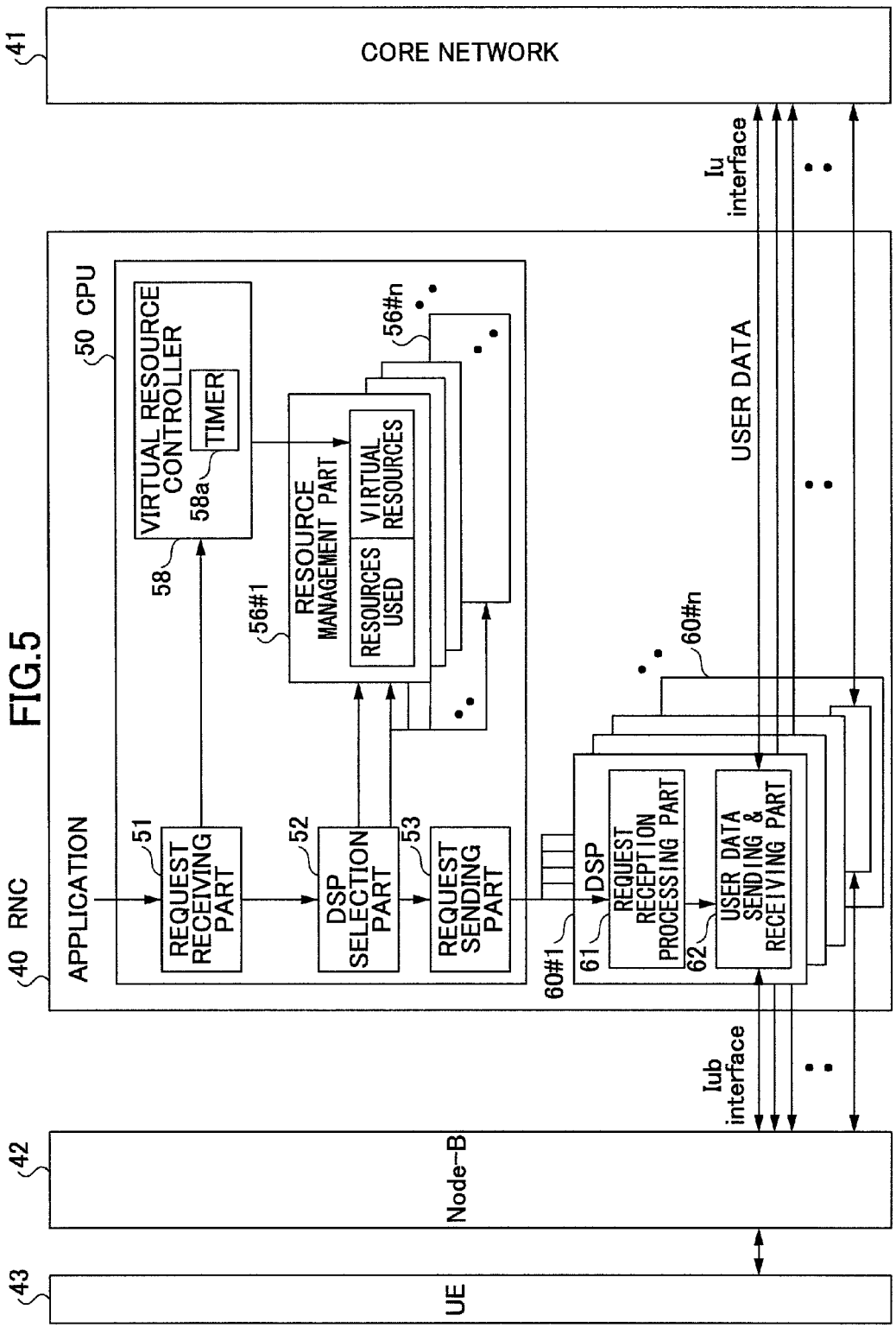

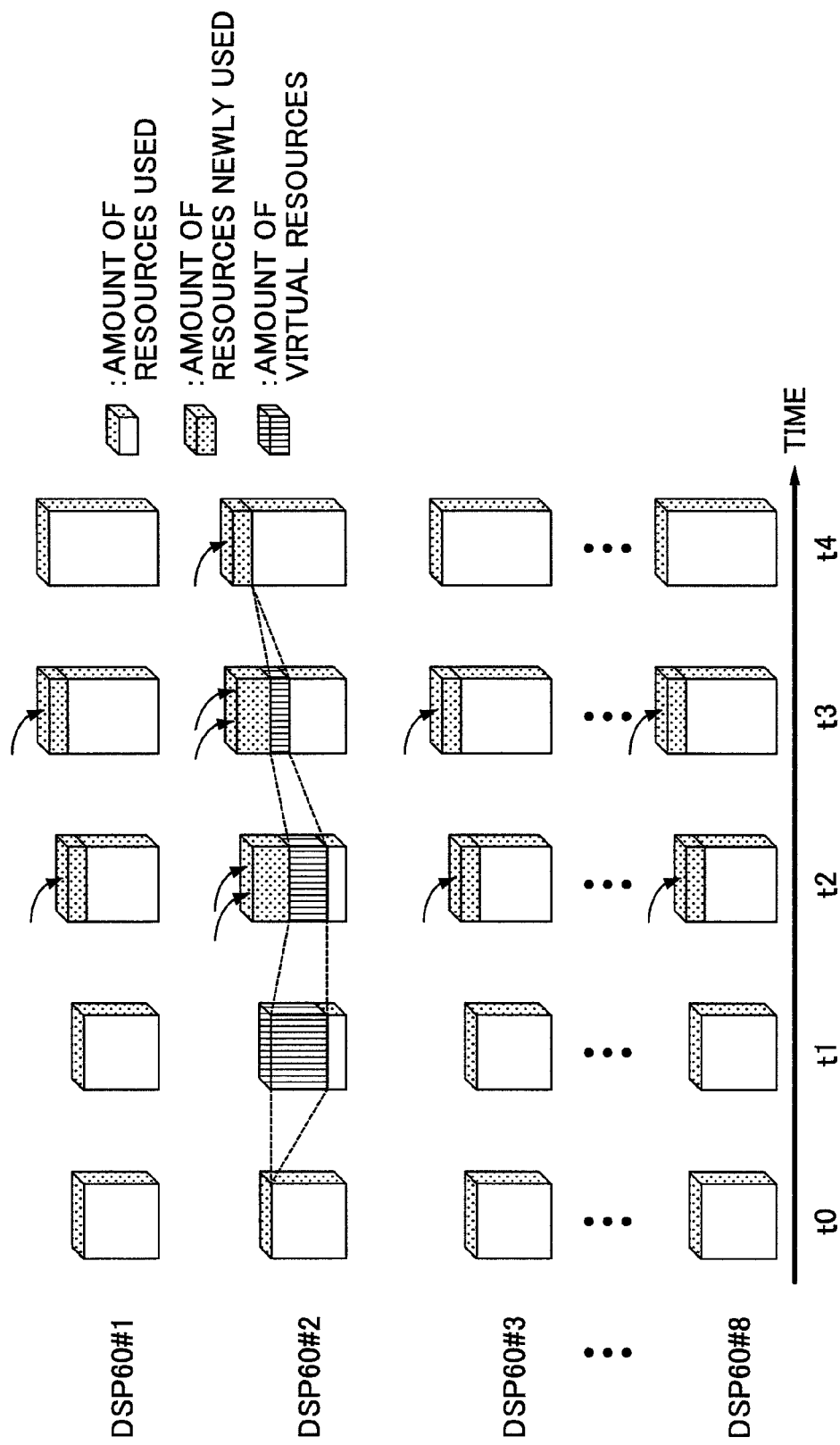

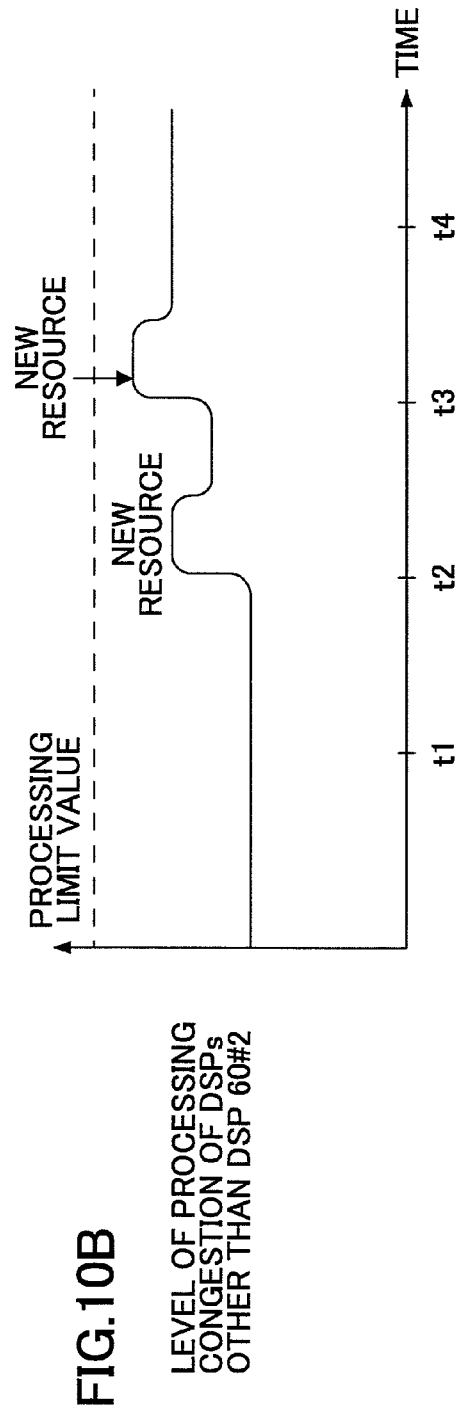

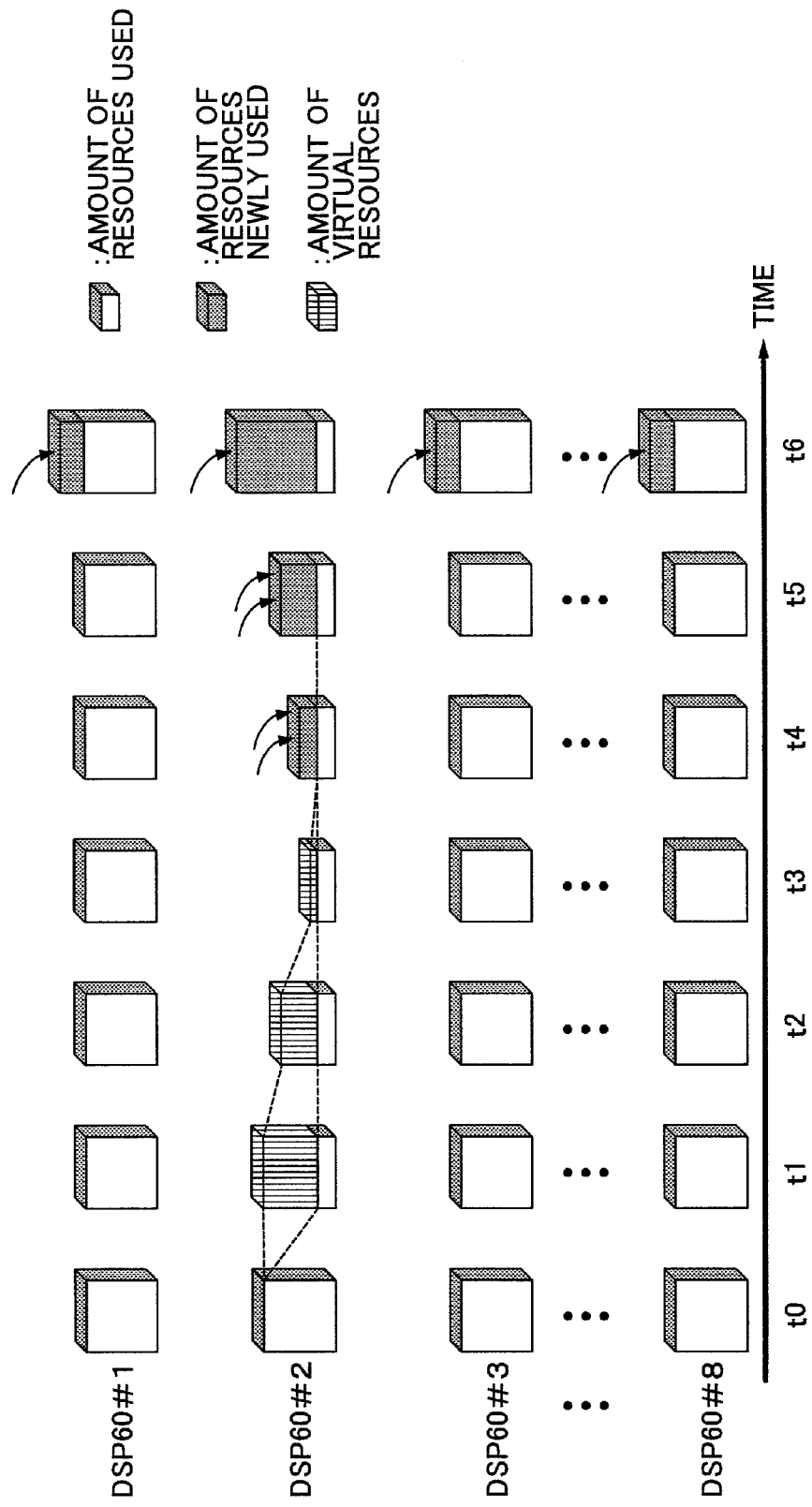

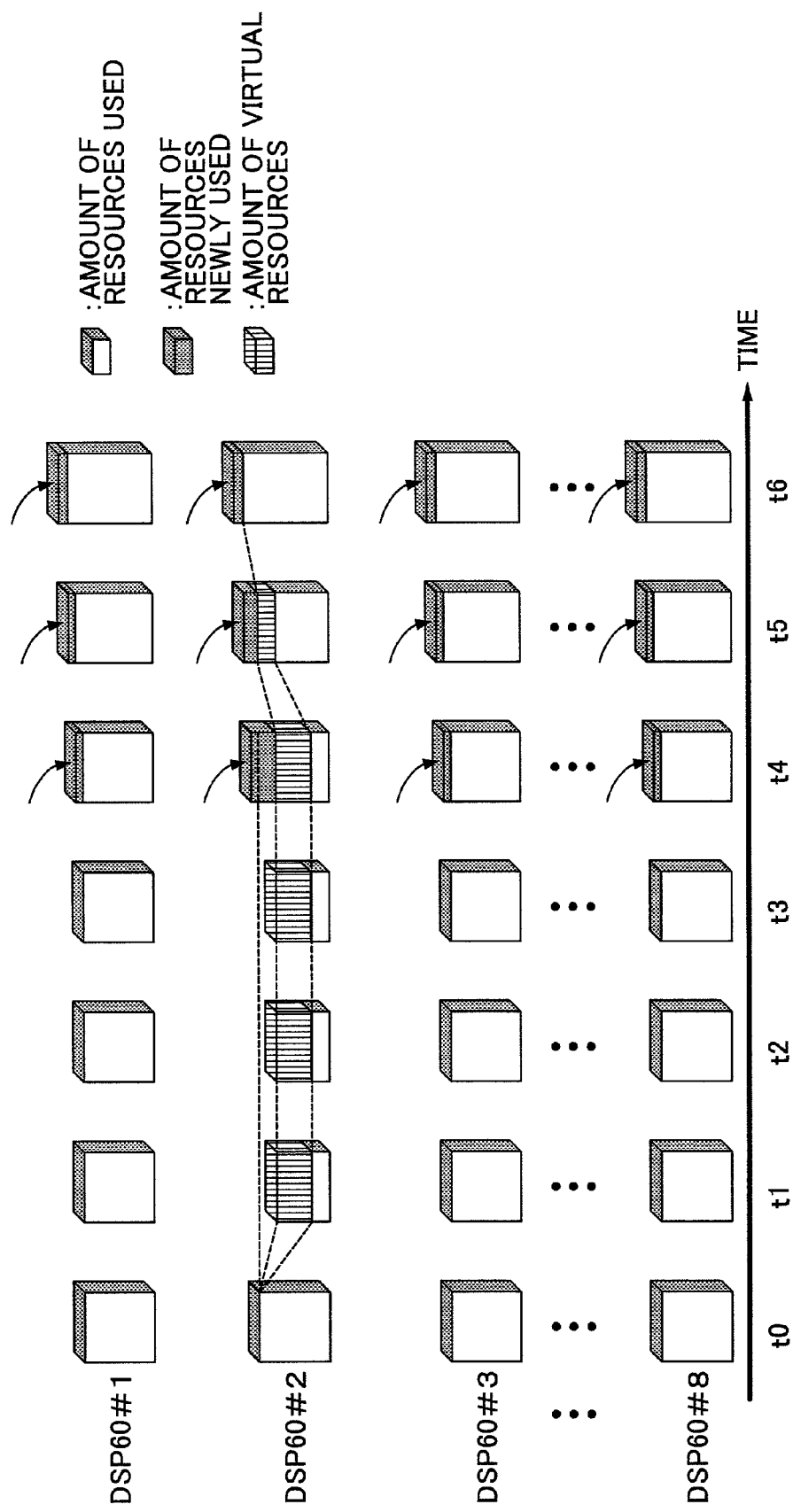

RESOURCE MANAGEMENT APPARATUS AND RADIO NETWORK CONTROLLER

BACKGROUND OF THE INVENTION

1. Field of the Invention

The present invention generally relates to resource management apparatuses and radio network controllers, and more particularly to a resource management apparatus for managing resources that are processing capabilities of a plurality of processing units, and to a radio (or wireless) network controller that uses such a resource management apparatus.

2. Description of the Related Art

FIG. 1 is a system block diagram showing an example of a general load balancing system. In FIG. 1, a CPU 1 is provided as a resource management apparatus, and devices 3#1 through 3#n, such as Digital Signal Processors (DSPs), that are provided as processing units, a memory 4 and an interface 5 are connected to the CPU 1 via a bus 2. The CPU 1 manages amounts of resources used by each of the devices 3#1 through 3#n, and balances or distributes the loads on the devices 3#1 through 3#n by monitoring states of use of the devices 3#1 through 3#n.

FIG. 2 is a system block diagram showing a structure of a radio network controller which is one form of a load balancing system. In FIG. 2, a radio network controller (RNC) 10 is connected to a core network 11 of a higher layer or level, and to a radio base station (Node-B) 12 of a lower layer or level. A mobile terminal (UE) 13 is connected by radio to the radio base station 12.

The radio network controller 10 includes a CPU 20 that is provided as a resource management apparatus, and DSPs 30#1 through 30#n. In the CPU 20, when a request receiving part 21 receives a line allocation request from the core network 11 or the radio base station 12 via an application, the request receiving part 21 notifies the line allocation request to a DSP selection part 22. The DSP selection part 22 refers to amounts of resources of each of the DSPs 30#1 through 30#n that are stored in resource management parts 26#1 through 26#n, and selects the DSP that has an amount of resources used that is the smallest. The amounts of resources that are referred to by the DSP selection part 22 are the amounts of resources presently used by the DSPs 30#1 through 30#n.

Thereafter, a request sending part 23 sends the line allocation request with respect to the DSP (one of the DSPs 30#1 through 30#n) that is selected by the DSP selection part 22. The DSP which receives this line allocation request by a request reception processing part 31 thereof forms a new line by a user data sending and receiving part 32, and thereafter constantly carries out a user data sending and receiving process.

Next, when the request receiving part 21 receives a line release request from the application, the amount of resources used is subtracted from the resource management part (one of the resource management parts 26#1 through 26#n) corresponding to the DSP to which the line release request is sent. Thereafter, the request sending part 23 sends the line release request with respect to the request reception processing part 31 of the DSP (one of the DSPs 30#1 through 30#n) to which the line release request is sent. The DSP which receives the line release request carries out a line release process of the user data sending and receiving part 32.

The amount of resources is a numerical value indicating the user data processing capability of each of the DSPs 30#1 through 30#n that are under the control of the CPU 20. The amount of resources takes a different value depending on the services (audio, packet, etc.) that are treated and the throughput. The larger the value of the amount of resources, the larger the user data processing capability per line. In addition, the amount of resources used indicates the amount of resources that is accumulated for each DSP every time the line allocation is made with respect to the DSPs 30#1 through 30#n that are under the control of the CPU 20.

When the CPU 20 issues the line allocation with respect to the DSPs 30#1 through 30#n, the CPU 20 selects the corresponding amount of resources from the service type of the line and the throughput. The CPU 20 adds this corresponding amount of resources to the amount of resources used by the DSP when making the line allocation, and subtracts this corresponding amount of resources from the amount of resources used by the DSP when releasing the line. In selecting the DSP when making the line allocation, the amount of resources used is used as the selecting condition, and the DSP having the smallest amount of resources used at the time of the selection is selected.

A Japanese Laid-Open Patent Application No. 2005-182697 proposes predicting the time of depletion or exhaustion by predicting the amount of computer resources used after a predetermined time from the amount of computer resources used.

In addition, a Japanese Laid-Open Patent Application No. 2004-318474 proposes generating a predicted transition of the amount of resources used from a transition of the amount of transactions generated, using a correlation of the amount of transactions processed in the past and the amount of resources used, and automatically changing the amount of resources allocated to each module.

Conventionally, a reference is made to the amount of resources used, and a device having the smallest amount of resources used is selected.

FIG. 3 is a diagram showing changes in examples of the amounts of resources used by each of the DSPs 30#1 through 30#n with time. If only the amount of resources used by the DSP 30#2 becomes extremely small by releasing the line at a time t1, the line allocation at a subsequent time t2 becomes concentrated on the DSP 30#2 having the small amount of resources used.

As a result, in the DSP 30#2 where the line is allocated in a concentrated manner within a short time, a congestion occurs among the reception processes of the request reception processing part 31 for the line allocation requests from the CPU 20, and as shown in FIG. 4A, a processing limit value is exceeded within the DSP 30#2. Consequently, the process of the user data sending and receiving part 32 within the DSP 30#2 is pressed, and there is a possibility of generating an abnormal state such as a response delay.

On the other hand, since no line allocation is made with respect to the DSPs 30#1 and 30#3 through 30#n other than the DSP 30#2 that is in the congestion state, there are margins for the processes of the other DSPs 30#1 and 30#3 through 30#n, as shown in FIG. 4B, and there was a problem in that the load balancing or distribution does not function satisfactorily at the time t2.

SUMMARY OF THE INVENTION

Accordingly, it is a general object of the present invention to provide a novel and useful resource management apparatus and radio network controller, in which the problems described above are suppressed.

Another and more specific object of the present invention is to provide a resource management apparatus and a radio network controller, which can prevent congestion of processes in a particular processing unit and satisfactorily balance or distribute the load to a plurality of processing units, even in a situation where the amount of resources used is small only in the particular processing unit.

Still another object of the present invention is to provide a resource management apparatus of a load balancing system that balances loads of a plurality of processing units, the resource management apparatus managing resources that are processing capabilities of the plurality of processing units, and comprising a resource management part configured to manage an amount of resources used and an amount of virtual resources of each of the plurality of processing units; a selection and control part configured to select a processing unit having a smallest sum of the amount of resources used and the amount of virtual resources, that are managed by the resource management part, in response to an external process request, and to increase the amount of resources used by the selected processing unit, managed by the resource management part, and to decrease the amount of resources used by a processing unit corresponding to an external process release request, managed by the resource management part, in response to the process release request; a virtual resource control part configured to increase the amount of virtual resources of the processing unit corresponding to the process release request, managed by the resource management part, in response to the process release request; and a request sending part configured to send the external process request or process release request to the selected or corresponding processing unit. According to the resource management apparatus of the present invention, it is possible to prevent congestion of processes in a particular processing unit and satisfactorily balance or distribute the load to a plurality of processing units, even in a situation where the amount of resources used is small only in the particular processing unit.

In the resource management apparatus, the virtual resource control part may increase the amount of virtual resources by the same amount as or, a predetermined proportion of, the amount of resources used that is decreased by the selection and control part.

In the resource management apparatus, the virtual resource control part may decrease the amount of virtual resources of all of the plurality of processing units, managed by the resource management part, by a constant proportion for every predetermined time.

A further object of the present invention is to provide a resource management apparatus of a load balancing system that balances loads of a plurality of processing units, the resource management apparatus managing resources that are processing capabilities of the plurality of processing units, and comprising a resource management part configured to manage an amount of resources used and an amount of virtual resources of each of the plurality of processing units; a selection and control part configured to select a processing unit having a smallest sum of the amount of resources used and the amount of virtual resources, that are managed by the resource management part, in response to an external process request, and to increase the amount of resources used by the selected processing unit, managed by the resource management part, and to decrease the amount of resources used by a processing unit corresponding to an external process release request, managed by the resource management part, in response to the process release request; a virtual resource control part configured to set the amount of virtual resources of each of the plurality of processing units managed by the resource management part, at a predetermined period, based on a maximum amount of resources used and an increasable amount of resources of the plurality of processing units, and the amount of resources used by said each of the plurality of processing units; and a request sending part configured to send the external process request or process release request to the selected or corresponding processing unit. According to the resource management apparatus of the present invention, it is possible to prevent congestion of processes in a particular processing unit and satisfactorily balance or distribute the load to a plurality of processing units, even in a situation where the amount of resources used is small only in the particular processing unit.

In the resource management apparatus, the virtual resource control part may set the amount of virtual resources of each of the plurality of processing units to a value that is obtained by subtracting the increasable amount of resources and the amount of resources used by said each of the plurality of processing units from the maximum amount of usable resources of the plurality of processing units.

Another object of the present invention is to provide a radio network controller comprising a resource management unit described above, the resource management unit sending an external line allocation request or line release request to the selected or corresponding processing unit, each of the plurality of processing units including a request receiving part configured to receive the line allocation request or the line release request from the resource management unit, and a user data sending and receiving part configured to form a new line in response to the line allocation request and to carry out a user data sending and receiving process, and configured to release the line in response to the line release request. According to the radio network controller of the present invention, it is possible to prevent congestion of processes in a particular processing unit and satisfactorily balance or distribute the load to a plurality of processing units, even in a situation where the amount of resources used is small only in the particular processing unit.

Other objects and further features of the present invention will be apparent from the following detailed description when read in conjunction with the accompanying drawings.

BRIEF DESCRIPTION OF THE DRAWINGS

FIG. 1 is a system block diagram showing an example of a general load balancing system;

FIG. 2 is a system block diagram showing a structure of a radio network controller which is one form of a load balancing system;

FIG. 3 is a diagram showing changes in examples of amounts of resources used by each DSP with time;

FIGS. 4A and 4B are diagrams showing changes in a level of processing congestion of each DSP with time;

FIG. 5 is a system block diagram showing a first embodiment of a radio network controller which is one form of a load balancing system of the present invention;

FIG. 9 is a diagram showing changes in amounts of resources used by each DSP with time in the first embodiment;

FIGS. 10A and 10B are diagrams showing changes in the level of the processing congestion of each DSP with time;

FIG. 12 is a diagram showing changes in the amounts of the resources used by each DSP with time in the first embodiment;

FIG. 15 is a diagram showing changes in amounts of resources used by each DSP with time in the second embodiment.

DESCRIPTION OF THE PREFERRED EMBODIMENTS

Figure 6:
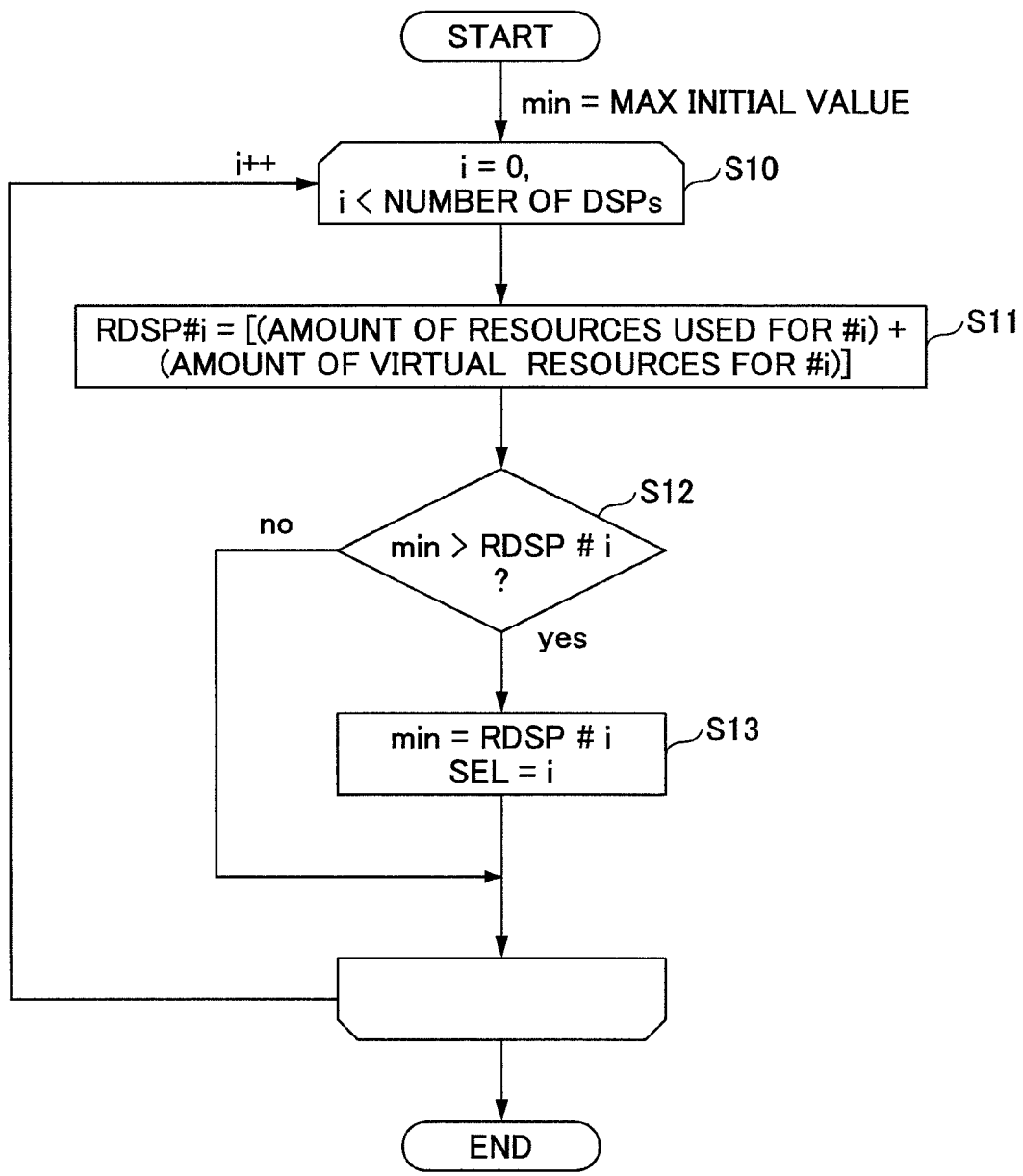
FIG. 6 is a flow chart for explaining an embodiment of a DSP selection process.

A description will be given of embodiments of the present invention, by referring to FIG. 5 and the subsequent figures.

[First Embodiment]

FIG. 5 is a system block diagram showing a first embodiment of a radio network controller which is one form of a load balancing system of the present invention. In FIG. 5, a radio network controller (RNC) 40 is connected to a core network 41 of a higher layer or level, and to a radio base station (Node-B) 42 of a lower layer or level. A mobile terminal (UE) 43 is connected by radio to the radio base station 42.

The radio network controller 40 includes a CPU 50 that is provided as a resource management apparatus, and a plurality of DSPs 60#1 through 60#n that are provided as processing units.

The CPU 50 includes a request receiving part 51 for receiving process requests for line allocation and line release from the apparatus in the higher layer or level, a DSP selection part 52 for selecting the DSP to which the process request is to be sent, a request sending part 53 for sending the process request to the DSP which is selected as a request sending destination, resource management parts 56#1 through 56#n for managing the amount of resources used and an amount of virtual resources of each DSP, and a virtual resource controller 58 for updating (increasing or decreasing) and controlling the amounts of virtual resources managed by the resource management parts 56#1 through 56#n.

Each of the DSPs 60#1 through 60#n includes a request reception processing part 61 for carrying out a reception process with respect to the process request from the CPU 50, and a user data sending and receiving part 62 for sending and receiving the user data.

In the CPU 50, when the request receiving part 51 receives a line allocation request from the core network 41 or the radio base station 42 via an application, the request receiving part 51 notifies the line allocation request to the DSP selection part 52. The DSP selection part 52 refers to the amounts of resources used and the amounts of virtual resources of each of the DSPs 60#1 through 60#n that are stored in resource management parts 56#1 through 56#n, and selects the DSP that has the smallest amount of resources.

Each of the amounts of resources that are referred to by the DSP selection part 52 is the sum of the amount of resources used by and the amount of virtual resources of each the DSPs 60#1 through 60#n. Thereafter, the request sending part 53 sends the line allocation request with respect to the DSP (one of the DSPs 60#1 through 60#n) that is selected by the DSP selection part 52. The DSP which receives this line allocation request by the request reception processing part 61 thereof forms a new line by the user data sending and receiving part 62, and thereafter constantly carries out a user data sending and receiving process.

The amount of resources is a numerical value indicating the user data processing capability of each of the DSPs 60#1 through 60#n that are under the control of the CPU 50. The amount of resources takes a different value depending on the services (audio, packet, etc.) that are treated and the throughput. The larger the value of the amount of resources, the larger the user data processing capability per line. In addition, the amount of resources used indicates the amount of resources that is accumulated for each DSP every time the line allocation is made with respect to the DSPs 60#1 through 60#n that are under the control of the CPU 50.

When the CPU 50 issues the line allocation with respect to the DSPs 60#1 through 60#n, the CPU 50 selects the corresponding amount of resources from the service type of the line and the throughput. The CPU 50 adds this corresponding amount of resources to the amount of resources used by the DSP when making the line allocation, and subtracts this corresponding amount of resources from the amount of resources used by the DSP when releasing the line. In selecting the DSP when making the line allocation, the sum of the amount of resources used and the amount of virtual resources is used as the selecting condition, and the DSP having the smallest sum of the amount of resources used and the amount of virtual resources at the time of the selection is selected.

Next, when the request receiving part 51 receives a line release request from the core network 41 or the radio base station 42 via the application, the request receiving part 51 issues a virtual resource increase request with respect to the virtual resource controller 58. The virtual resource controller 58 which receives the virtual resource increase request instructs the updating (increasing) of the virtual resource corresponding to the DSP to which the line release request is sent, with respect to the resource management parts 56#1 through 56#n. The amount of virtual resources that is increased is a predetermined proportion $\alpha$ (for example, several tens of % to 100%) of the amount of resources released, for example. The virtual resource controller 58 decreases the amounts of virtual resources of all of the resource management parts 56#1 through 56#n by a constant proportion $\beta$ (for example, several % to several tens of %) for every predetermined time $\tau$ (for example, several msec to several tens of msec).

In addition, the DSP selection part 52 that receives the line release request from the request receiving part 51 subtracts the amount of resources used from the resource management part (one of the resource management parts 56#1 through 56#n) corresponding to the DSP to which the line release request is sent.

Thereafter, the request sending part 53 sends the line release request with respect to the request reception processing part 61 of the DSP (one of the DSPs 60#1 through 60#n) to which the line release request is sent. The DSP which receives the line release request carries out a line release process of the user data sending and receiving part 62.

FIG. 6 is a flow chart for explaining an embodiment of a DSP selection process that is carried out by the DSP selection part 52. In FIG. 6, a step S10 indicates a loop process that is executed by successively incrementing a variable "i" from "1" to "n" which is the total number of DSPs. Prior to this loop process, a variable "min" is initially set to a maximum value MAX.

A step S11 obtains the sum of the amount of resources used and the amount of virtual resources that are managed by the resource management part 56#i for the DSP 60#i, and stores the sum to a variable RDSP#i. Next, a step S12 compares the value of the variable "min" and the value of the variable RDSP#i, and transfers the value of the variable RDSP#i to the variable "min" only when the value of the variable "min" is greater than the value of the variable RDSP#i, and transfers the value of the variable "i" to a variable SEL.

Accordingly, at the time when the loop process described above ends, the variable "i" stores the number (that is, the identification number) of the DSP that has the smallest sum of the amount of resources used and the amount of virtual resources.

Figure 7:
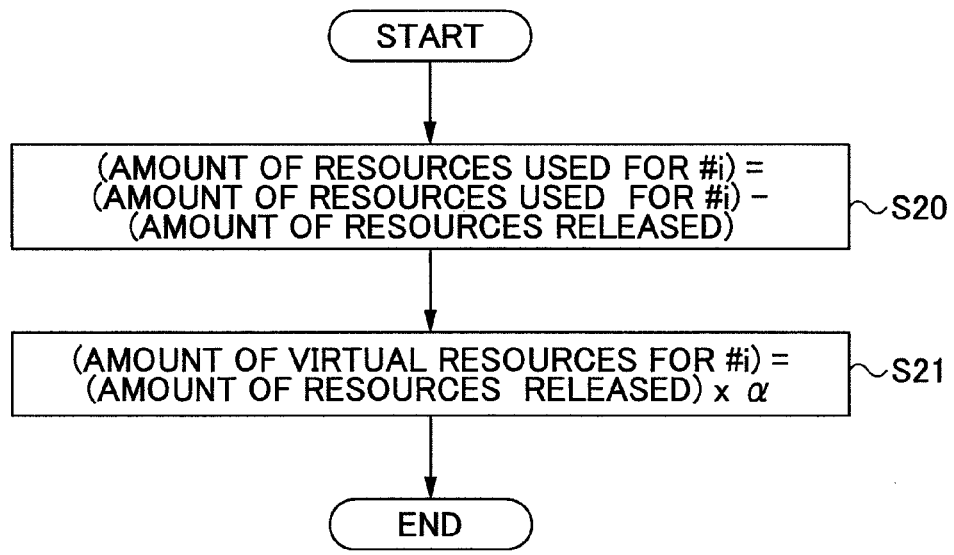
FIG. 7 is a flow chart for explaining an embodiment of a line release process.

FIG. 7 is a flow chart for explaining an embodiment of a line release process that is executed by the DSP selection part 52 and the virtual resource controller 58 in response to the line release request. In a step S20 shown in FIG. 7, the DSP selection part 52 decreases the amount #i of resources used that is managed by the resource management part 56#i for the DSP 60#i for which the line release request is received, by the amount of resources to be released that is instructed by the line release request.

In addition, in a step S21, the virtual resource controller 58 increases the amount of virtual resources managed by the resource management part 56#i for the DSP 60#i for which the line release request is received, by the predetermined proportion a of the amount of resources to be released that is instructed by the line release request.

Figure 8:
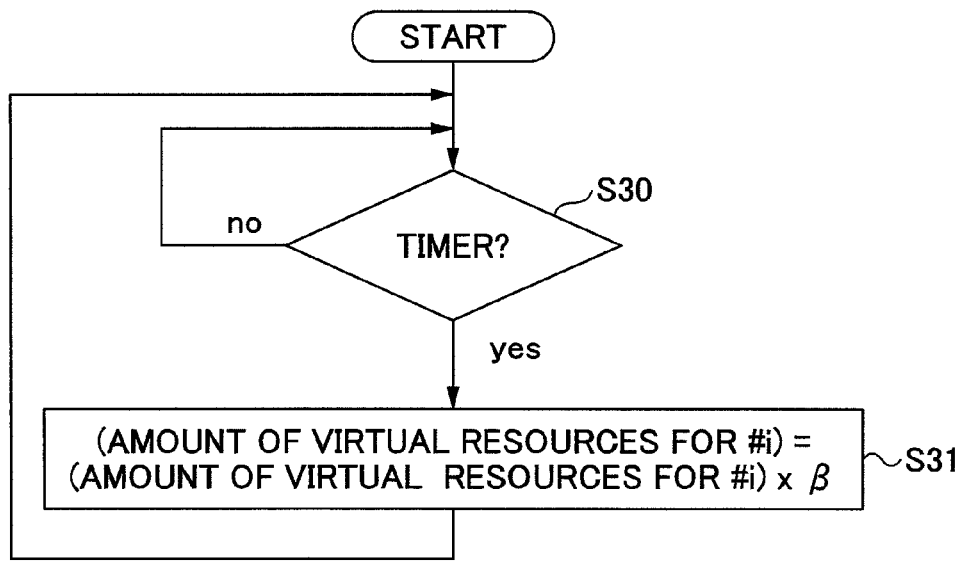
FIG. 8 is a flow chart for explaining an embodiment of a timer process.

FIG. 8 is a flow chart for explaining an embodiment of a timer process that is executed by the virtual resource controller 58. In a step S30 shown in FIG. 8, the virtual resource controller 58 judges whether or not a predetermined time τ, such as 10 msec, for example, is measured by an internal timer 58a. The process advances to a step S31, that is, the process of the step S31 is started, if the judgement result in the step S30 becomes YES. In the step S31, the virtual resource controller 58 decreases the amounts #i of virtual resources of all of the resource management parts 56#1 through 56#n by the constant proportion β.

FIG. 9 is a diagram showing changes in the amounts of resources used by each of the DSPs 60#1 through 60#n with time in the first embodiment. Even if only the amount of resources used by the DSP 60#2 becomes extremely small by releasing the line at a time t1, the amount of virtual resources indicated by vertical lines increases by the predetermined proportion α of the amount of resources released. In the line allocation thereafter, the DSP with the smallest sum of the amount of resources used and the amount of virtual resources is selected. For this reason, at a time t2, although there are more line allocations with respect to the DSP 60#2 than the line allocations with respect to the other DSPs 60#1 and 60#3 through 60#n, the line allocations are approximately averaged. Thereafter, the amount of virtual resources of the DSP 60#2 is gradually decreased at times t2, t3, . . . .

As a result, the level of processing congestion of the DSP 60#2 does not exceed the processing limit value, as shown in FIG. 10A. In other words, even in a situation where only the amount of resources used by a particular processing unit becomes small, it is possible to prevent the congestion of the processes of this particular processing unit and satisfactorily balance or distribute the loads among the plurality of processing units.

In addition, the level of processing congestion of the DSPs 60#1 and 60#3 through 60#n other than the DSP 60#2 becomes as shown in FIG. 10B because the new line allocation is made, and satisfactory load balancing or distribution is achieved at the time t2. Furthermore, since the amount of virtual resources of the DSP 60#2 gradually decreases, the amount of resources used by the DSP 60#2 gradually increases at the subsequent times t2, t3, . . . , and becomes approximately the same as the amounts of resources of the other DSPs 60#1 and 60#3 through 60#n.

Figure 11A:
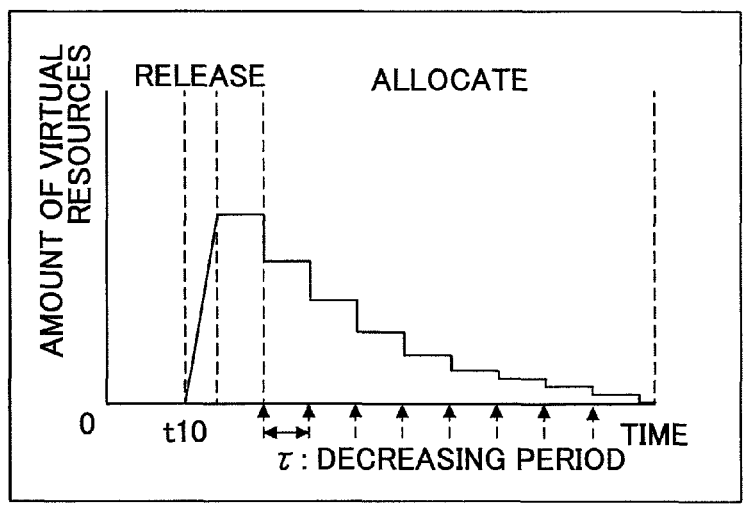
FIGS. 11A, 11B and 11C are diagrams showing changes in amounts of various resources with time for the present invention and the conventional case.
Figure 11B:
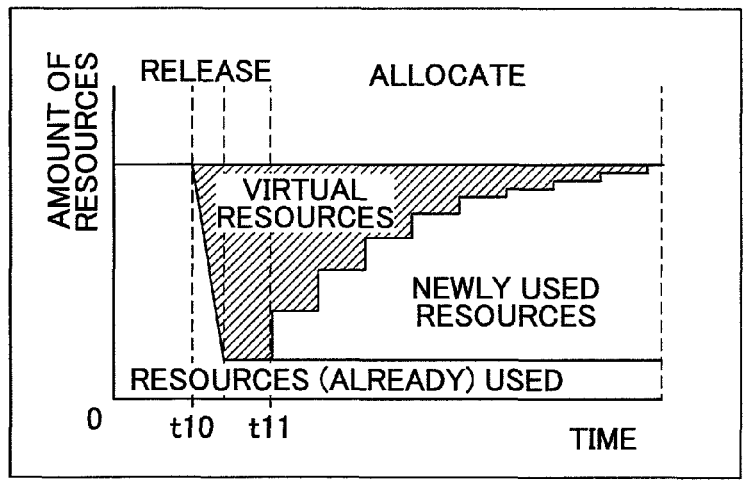
Figure 11C:
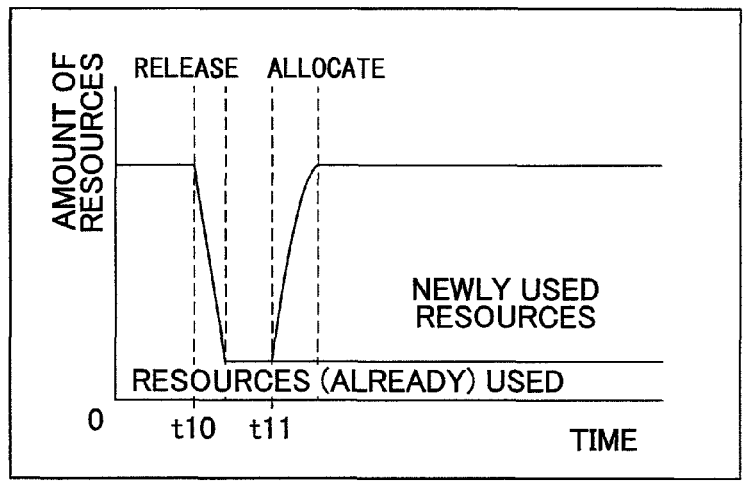

FIG. 11A is a diagram showing the changes in the amounts of virtual resources with time for the DSP 60#2. In FIG. 11A, when the line release is instructed at a time t10, the amount of virtual resources temporarily increases, and the amount of virtual resources thereafter decreases for every predetermined time (subtracting period) τ. Hence, the amount of resources (already) used, the amount of resources newly used, and the amount of virtual resources of the DSP 60#2 respectively change as shown in FIG. 11B. In other words, the sum of the amount of resources newly used and the amount of virtual resources becomes approximately constant or, gradually decreases. On the other hand, in the conventional case, the amount of resources used rapidly decreases at the time t10 when the line release is instructed, as shown in FIG. 11C, and the amount of resources used thereafter rapidly increases at a time t11. Because of this rapid increase in the amount of resources used, the processing limit of the DSP 30#2 is exceeded in the conventional case.

[Second Embodiment]

The first embodiment described above is effective when the resources are allocated in a concentrated manner in a state where the amount of virtual resources is large. However, if a predetermined time elapses from the state where the amount of virtual resources is large and the amount of virtual resources becomes small at a time t4 and after in FIG. 12, the effects of the virtual resources are lost when the resources are allocated in the concentrated manner, and the line allocation is concentrated on the DSP 60#2 which has the small amount of resources used.

As a result, in the DSP 60#2 to which the line allocation is made in the concentrated manner within a short time, a congestion occurs among the reception processes of the request reception processing part 61 for the line allocation requests from the CPU 50. Consequently, the process of the user data sending and receiving part 62 within the DSP 60#2 is pressed, and it is impossible to sufficiently avoid a situation where an abnormal state such as a response delay is generated.

Figure 13:
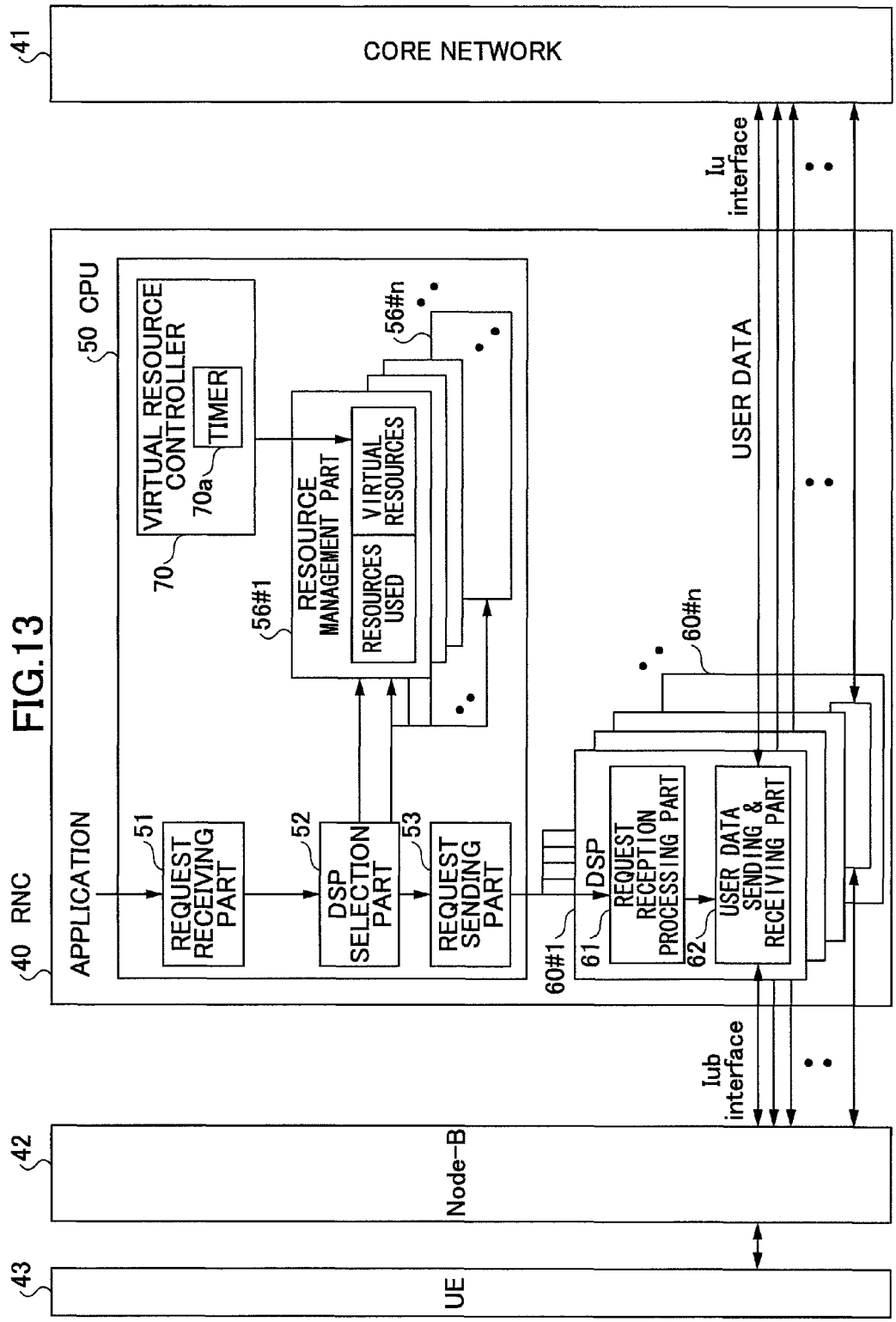
FIG. 13 is a system block diagram showing a second embodiment of the radio network controller which is one form of the load balancing system of the present invention.

This second embodiment described hereunder avoids such a situation where the abnormal state is generated. FIG. 13 is a system block diagram showing this second embodiment of the radio network controller which is one form of the load balancing system of the present invention. In FIG. 13, those parts that are the same as those corresponding parts in FIG. 5 are designated by the same reference numerals.

In FIG. 13, a radio network controller (RNC) 40 is connected to a core network 41 of a higher layer or level, and to a radio base station (Node-B) 42 of a lower layer or level. A mobile terminal (UE) 43 is connected by radio to the radio base station 42.

The radio network controller 40 includes a CPU 50 that is provided as a resource management apparatus, and a plurality of DSPs 60#1 through 60#n that are provided as processing units.

The CPU 50 includes a request receiving part 51 for receiving process requests for line allocation and line release from the apparatus in the higher layer or level, a DSP selection part 52 for selecting the DSP to which the process request is to be sent, a request sending part 53 for sending the process request to the DSP which is selected as a request sending destination, resource management parts 56#1 through 56#n for managing the amount of resources used and the amount of virtual resources of each DSP, and a virtual resource controller 70 for updating (increasing or decreasing) and controlling the amounts of virtual resources managed by the resource management parts 56#1 through 56#n.

Each of the DSPs 60#1 through 60#n includes a request reception processing part 61 for carrying out a reception process with respect to the process request from the CPU 50, and a user data sending and receiving part 62 for sending and receiving the user data.

In the CPU 50, when the request receiving part 51 receives a line allocation request from the core network 41 or the radio base station 42 via an application, the request receiving part 51 notifies the line allocation request to the DSP selection part 52. The DSP selection part 52 refers to the amounts of resources used and the amounts of virtual resources of each of the DSPs 60#1 through 60#n that are stored in resource management parts 56#1 through 56#n, and selects the DSP that has the smallest amount of resources.

Each of the amounts of resources that are referred to by the DSP selection part 52 is the sum of the amount of resources used by and the amount of virtual resources of each the DSPs 60#1 through 60#n. Thereafter, the request sending part 53 sends the line allocation request with respect to the DSP (one of the DSPs 60#1 through 60#n) that is selected by the DSP selection part 52. The DSP which receives this line allocation request by the request reception processing part 61 thereof forms a new line by the user data sending and receiving part 62, and thereafter constantly carries out a user data sending and receiving process.

The amount of resources is a numerical value indicating the user data processing capability of each of the DSPs 60#1 through 60#n that are under the control of the CPU 50. The amount of resources takes a different value depending on the services (audio, packet, etc.) that are treated and the throughput. The larger the value of the amount of resources, the larger the user data processing capability per line. In addition, the amount of resources used indicates the amount of resources that is accumulated for each DSP every time the line allocation is made with respect to the DSPs 60#1 through 60#n that are under the control of the CPU 50.

When the CPU 50 issues the line allocation with respect to the DSPs 60#1 through 60#n, the CPU 50 selects the corresponding amount of resources from the service type of the line and the throughput. The CPU 50 adds this corresponding amount of resources to the amount of resources used by the DSP when making the line allocation, and subtracts this corresponding amount of resources from the amount of resources used by the DSP when releasing the line. In selecting the DSP when making the line allocation, the sum of the amount of resources used and the amount of virtual resources is used as the selecting condition, and the DSP having the smallest sum of the amount of resources used and the amount of virtual resources at the time of the selection is selected.

Next, when the request receiving part 51 receives a line release request from the core network 41 or the radio base station 42 via the application, the request receiving part 51 notifies the line release request to the DSP selection part 52. The DSP selection part 52 subtracts the amount of resources used from the resource management part (one of the resource management parts 56#1 through 56#n) corresponding to the DSP to which the line release request is sent.

The virtual resource controller 70 sets the amount of virtual resources of all of the resource management parts 56#1 through 56#n for every predetermined time δ (for example, δ is several msec to several tens of msec) which is the virtual resource changing period.

Thereafter, the request sending part 53 sends the line release request with respect to the request reception processing part 61 of the DSP (one of the DSPs 60#1 through 60#n) to which the line release request is sent. The DSP which receives the line release request carries out a line release process of the user data sending and receiving part 62.

Figure 14:
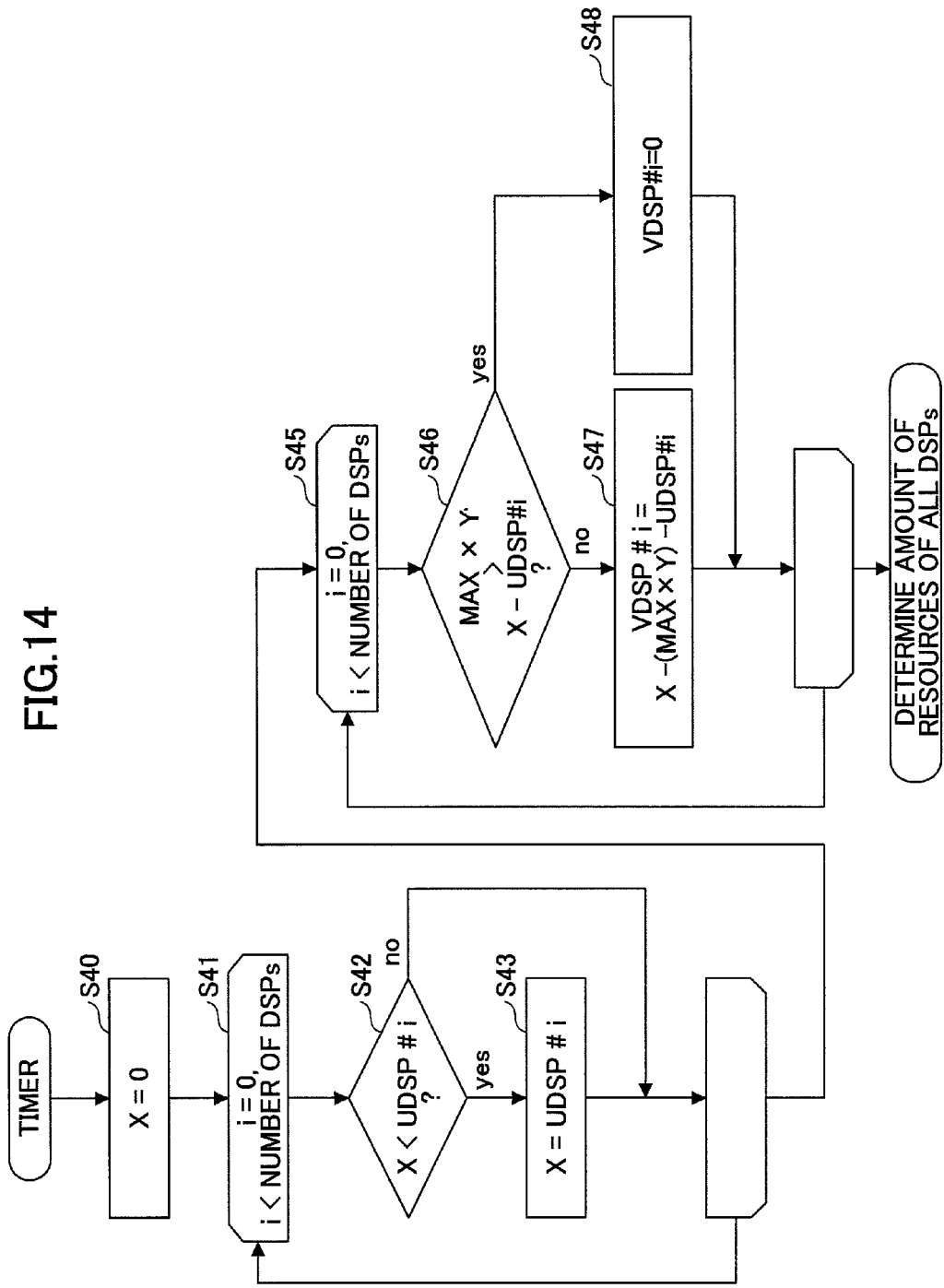
FIG. 14 is a flow chart for explaining an embodiment of a virtual resource setting process.

FIG. 14 is a flow chart for explaining an embodiment of a virtual resource setting process that is executed by the virtual resource controller 70. This virtual resource setting process is executed for every predetermined time δ in response to an interrupt from a timer 70a. In this case, MUX denotes the maximum amount of resources that may be set in each of the DSPs 60#1 through 60#n, and Y denotes a coefficient that is approximately 0.3, for example. Hence, (MUX×Y) denotes an amount of resources that may be increased at one time with respect to one DSP. Further, UDSP#i denotes the amount of resources used by the DSP 60#i, and VDSP#i denotes the amount of virtual resources of the DSP 60#i.

In FIG. 14, a step S40 resets a variable X to zero. A step S41 indicates a loop process that is executed by successively incrementing a variable "i" from "1" to "n" which is the total number of DSPs.

A step S42 judges whether or not the amount UDSP#i of resources used by the DSP 60#i and managed by the resource management part 56#i exceeds a value stored in the variable X. A step S43 stores the amount UDSP#i of resources used (that is, the contents of UDSP#i) in the variable X only when X<UDSP#i and the decision result in the step S42 is YES. Hence, the maximum amount of resources used by one of the DSPs 60#1 through 60#n is stored in the variable X.

A step S45 indicates a loop process that is executed by successively incrementing the variable "i" from "1" to "n" which is the total number of DSPs. A step S46 judges whether or not a value (X−UDSP#i), that is obtained by subtracting the amount UDSP#i of resources used by the DSP 60#i and managed by the resource management part 56#i from the maximum amount of resources used stored in the variable X, is less than (MUX×Y).

If (MUX×Y)<=(X−UDSP#i), that is, if a difference between the maximum amount of resources used and the amount of resources used by the DSP 60#i is greater than or equal to the increasable amount of resources, and the judgement result in the step S46 is NO, a step S47 sets [X−(MUX×Y)−UDSP#i] in the virtual amount VDSP#i of resources. In other words, the value that is obtained by subtracting the increasable amount of resources and the amount of resources used by the DSP 60#i from the maximum amount X of resources used, is set as the amount of virtual resources.

On the other hand, if (MUX×Y)>(X−UDSP#i), that is, if a difference between the maximum amount of resources used and the amount of resources used by the DSP 60#i is smaller than the increasable amount of resources, and the judgement result in the step S46 is YES, a step S48 sets the amount VDSP#i of virtual resources to zero, that is, VDSP#i=0.

FIG. 15 is a diagram showing the changes in the amounts of resources used by each of the DSPs 60#1 through 60#n with time in the second embodiment. Even if only the amount of resources used by the DSP 60#2 becomes extremely small by releasing the line at a time t1, the amount [X−(MUX×Y)−UDSP#i] of virtual resources indicated by vertical lines is set. In the line allocation thereafter, the DSP with the smallest sum of the amount of resources used and the amount of virtual resources is selected from the DSPs 60#1 through 60#n. For this reason, at a time t2, although there are more line allocations with respect to the DSP 60#2 than the line allocations with respect to the other DSPs 60#1 and 60#3 through 60#n, the line allocations are approximately averaged. Thereafter, as the amount of resources used by the DSP 60#2 increases at times t4 and t5, the amount of virtual resources of the DSP 60#2 gradually decreases.

As a result, the level of processing congestion of the DSP 60#2 does not exceed the processing limit value. In other words, even in a situation where only the amount of resources used by a particular processing unit becomes small, it is possible to prevent the congestion of the processes of this particular processing unit and satisfactorily balance or distribute the loads among the plurality of processing units.

Figure 16A:
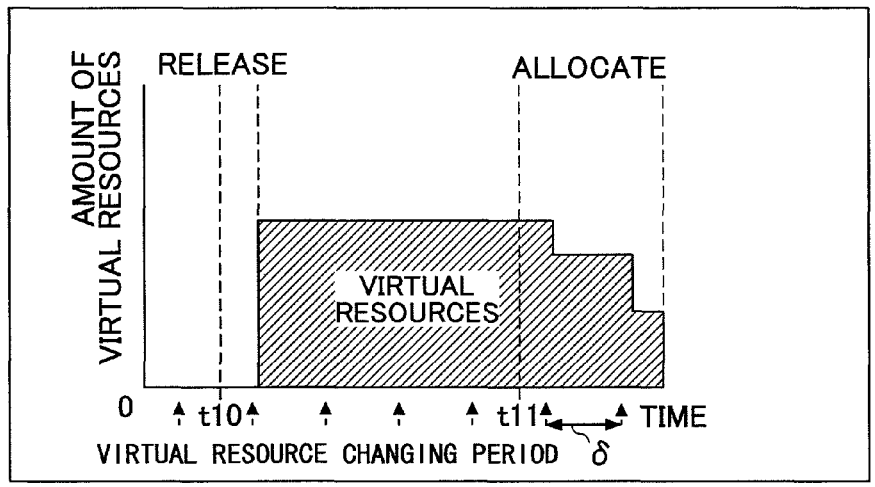
FIGS. 16A, 16B and 16C are diagrams showing changes in amounts of various resources and levels of processing congestion with time for the present invention.
Figure 16B:
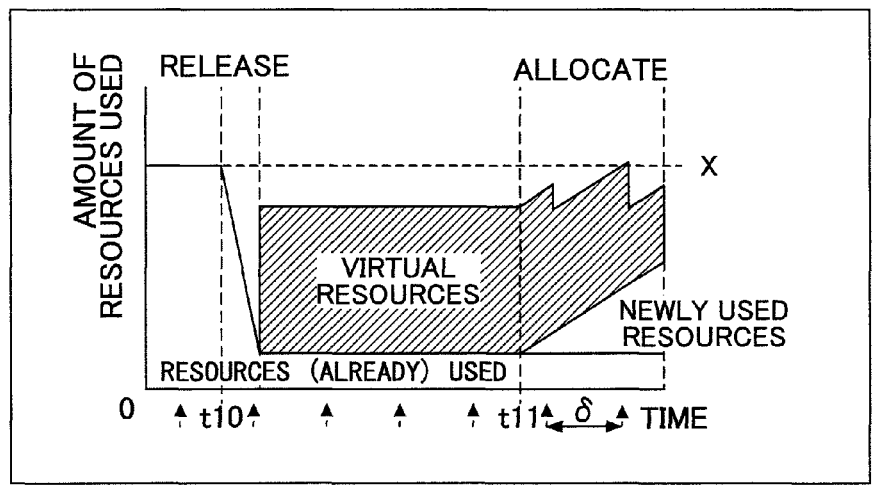
Figure 16C:
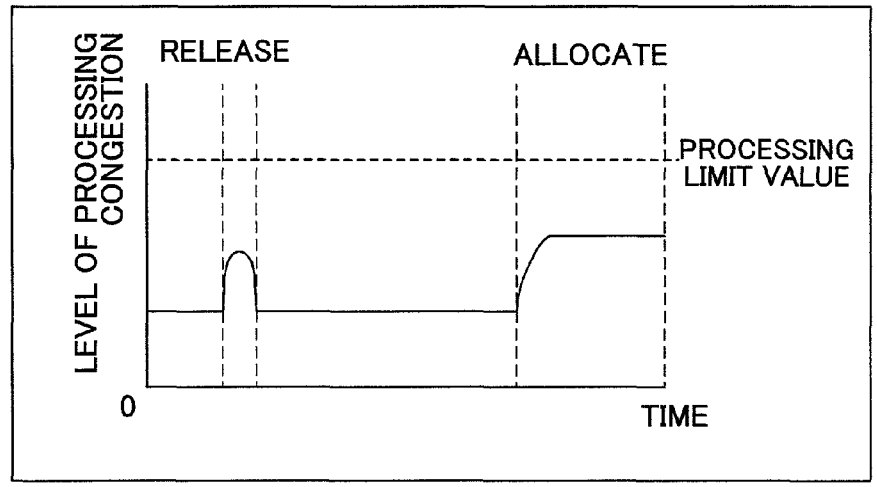

FIG. 16A is a diagram showing the changes in the amounts of virtual resources with time for the DSP 60#2. In FIG. 16A, when the line release is instructed at a time t10, the amount of virtual resources increases at a timing immediately thereafter of a virtual resource changing period 5. Thereafter, when the line allocation is made at a time t11 and after, the amount of virtual resources decreases. Hence, the amount of resources (already) used, the amount of resources newly used, and the amount of virtual resources of the DSP 60#2 respectively change as shown in FIG. 11B. In other words, the sum of the amount of resources newly used and the amount of virtual resources becomes approximately constant, and does not exceed the maximum amount X of resources that can be set even when the line allocation is made. The level of processing congestion of the DSP 60#2 does not exceed the processing limit value, as shown in FIG. 16C.

Accordingly, even in the time bands where the amount of virtual resources becomes small in the first embodiment, this second embodiment can maintain a desired amount of virtual resources. Hence, this second embodiment can prevent the line allocation from being concentrated to the DSP 60#2 having the small amount of resources used, and avoid the congestion in the DSP 60#2 among the reception processes of the line allocation requests.

In the embodiments described above, the resource management part 56 is used as an example of a resource management means or part, the DSP selection part 52 is used as an example of a selection and control means or part, the virtual resource controller 58 or 70 is used as an example of a virtual resource control means or part, the request sending part 53 is used as an example of a request sending means or part, the request reception processing part 61 is used as an example of a request reception means or part, and the user data sending and receiving part 62 is used as an example of a user data sending and receiving means or part.

This application claims the benefit of Japanese Patent Applications No. 2006-311805 filed Nov. 17, 2006 and No. 2007-209832 filed Aug. 10, 2007, in the Japanese Patent Office, the disclosures of which are hereby incorporated by reference.

Further, the present invention is not limited to these embodiments, but various variations and modifications may be made without departing from the scope of the present invention.

What is claimed is:

1. A resource management apparatus of a load balancing system that balances loads of a plurality of processing units, said resource management apparatus managing resources that are processing capabilities of the plurality of processing units, and comprising:
a processor comprising:
a resource management part configured to manage an amount of resources used and an amount of virtual resources of each of the plurality of processing units;
an amount of resources indicating a user data processing capability of the plurality of processing units that are under control of the processor, and
the amount of resources used indicating the amount of resources that is accumulated for each processing unit each time a line allocation is made with respect to the plurality of processing units that are under the control of the processor,
a selection and control part configured to select a processing unit having a smallest sum of the amount of resources used and the amount of virtual resources, that are managed by the resource management part, in response to an external process request, and to increase the amount of resources used by the selected processing unit, managed by the resource management part, and to decrease the amount of resources used by a processing unit corresponding to an external process release request, managed by the resource management part, in response to the external process release request;
a virtual resource control part configured to increase the amount of virtual resources of the processing unit corresponding to the external process release request, managed by the resource management part, in response to the external process release request; and
a request sending part configured to send the external process request to the selected processing unit or the external process release request to the corresponding processing unit,
wherein the virtual resource control part increases the amount of virtual resources by the same amount as or a predetermined proportion of the amount of resources used that is decreased by the selection and control part.

2. The resource management apparatus as claimed in claim 1, wherein the virtual resource control part decreases the amount of virtual resources of all of the plurality of processing units, managed by the resource management part, by a constant proportion for every predetermined time.

3. A resource management apparatus of a load balancing system that balances loads of a plurality of processing units, said resource management apparatus managing resources that are processing capabilities of the plurality of processing units, and comprising:
a processor comprising:
a resource management part configured to manage an amount of resources used and an amount of virtual resources of each of the plurality of processing units;
an amount of resources indicating a user data processing capability of the plurality of processing units that are under control of the processor, and
the amount of resources used indicating the amount of resources that is accumulated for each processing unit each time a line allocation is made with respect to the plurality of processing units that are under the control of the processor,
a selection and control part configured to select a processing unit having a smallest sum of the amount of resources used and the amount of virtual resources, that are managed by the resource management part, in response to an external process request, and to increase the amount of resources used by the selected processing unit, managed by the resource management part, and to decrease the amount of resources used by a processing unit corresponding to an external process release request, managed by the resource management part, in response to the external process release request;
a virtual resource control part configured to set the amount of virtual resources of each of the plurality of processing units managed by the resource management part, at a predetermined period, based on a maximum amount of resources used and an increasable amount of resources of the plurality of processing units, and the amount of resources used by said each of the plurality of processing units; and a request sending part configured to send the external process request to the selected processing unit or the external process release request to the corresponding processing unit, wherein the virtual resource control part sets the amount of virtual resources of each of the plurality of processing units to a value that is obtained by subtracting the increasable amount of resources and the amount of resources used by said each of the plurality of processing units from the maximum amount of usable resources of the plurality of processing units.

4. A radio network controller comprising:

a resource management apparatus of a load balancing system that balances loads of a plurality of processing units, said resource management apparatus managing resources that are processing capabilities of the plurality of processing units; and a plurality of processing units configured to carry out a reception process with respect to a process request from the resource management apparatus, and send and receive user data, wherein the resource management apparatus comprises a processor comprising:

a resource management part configured to manage an amount of resources used and an amount of virtual resources of each of the plurality of processing units;

an amount of resources indicating a user data processing capability of the plurality of processing units that are under control of the processor, and the amount of resources used indicating the amount of resources that is accumulated for each processing unit each time a line allocation is made with respect to the plurality of processing units that are under the control of the processor, a selection and control part configured to select a processing unit having a smallest sum of the amount of resources used and the amount of virtual resources, that are managed by the resource management part, in response to an external process request, and to increase the amount of resources used by the selected processing unit, managed by the resource management part, and to decrease the amount of resources used by a processing unit corresponding to an external process release request, managed by the resource management part, in response to the external process release request;

a virtual resource control part configured to increase the amount of virtual resources of the processing unit corresponding to the external process release request, managed by the resource management part, in response to the external process release request; and a request sending part configured to send the external process request to the selected processing unit or the external process release request to the corresponding processing unit, wherein the virtual resource control part increases the amount of virtual resources by the same amount as or, a predetermined proportion of, the amount of resources used that is decreased by the selection and control part, wherein said resource management apparatus sends an external line allocation request to the selected processing unit or an external line release request to the corresponding processing unit, and wherein each of the plurality of processing units includes a request receiving part configured to receive the external line allocation request or the external line release request from the resource management unit, and a user data sending and receiving part configured to form a new line in response to the external line allocation request and to carry out a user data sending and receiving process, and release the line in response to the external line release request.

5. The radio network controller as claimed in claim 4, wherein when the processor issues the line allocation with respect to the plurality of processing units, the processor selects a corresponding amount of resources from a service type of the line and a throughput;

the processor adds the corresponding amount of resources to the amount of resources used by a corresponding processing unit when making the line allocation;

the processor subtracts the corresponding amount of resources from the amount of resources used by the corresponding processing unit when releasing the line; and in selecting the processing unit when making the line allocation, the sum of the amount of resources used and the amount of virtual resources is used as a selecting condition, and the processing unit having the smallest sum of the amount of resources used and the amount of virtual resources at the time of the selection is selected.

6. A radio network controller comprising:

a resource management apparatus of a load balancing system that balances loads of a plurality of processing units, said resource management apparatus managing resources that are processing capabilities of the plurality of processing units; and a plurality of processing units configured to carry out a reception process with respect to a process request from the resource management apparatus, and send and receive user data, wherein the resource management apparatus comprises a processor comprising:

a resource management part configured to manage an amount of resources used and an amount of virtual resources of each of the plurality of processing units;

an amount of resources indicating a user data processing capability of the plurality of processing units that are under control of the processor, and the amount of resources used indicating the amount of resources that is accumulated for each processing unit each time a line allocation is made with respect to the plurality of processing units that are under the control of the processor, a selection and control part configured to select a processing unit having a smallest sum of the amount of resources used and the amount of virtual resources, that are managed by the resource management part, in response to an external process request, and to increase the amount of resources used by the selected processing unit, managed by the resource management part, and to decrease the amount of resources used by a processing unit corresponding to an external process release request, managed by the resource management part, in response to the external process release request;

a virtual resource control part configured to set the amount of virtual resources of each of the plurality of processing units managed by the resource management part, at a predetermined period, based on a maximum amount of resources used and an increasable amount of resources of the plurality of processing units, and the amount of resources used by said each of the plurality of processing units; and a request sending part configured to send the external process request to the selected processing unit or the external process release request the corresponding processing unit, wherein the virtual resource control part sets the amount of virtual resources of each of the plurality of processing units to a value that is obtained by subtracting the increasable amount of resources and the amount of resources used by said each of the plurality of processing units from the maximum amount of usable resources of the plurality of processing units, wherein said resource management apparatus sends an external line allocation request to the selected processing unit or an external line release request the corresponding processing unit, and wherein each of the plurality of processing units includes a request receiving part configured to receive the external line allocation request or the external line release request from the resource management unit, and a user data sending and receiving part configured to form a new line in response to the external line allocation request and to carry out a user data sending and receiving process, and configured to release the line in response to the external line release request.

7. The radio network controller as claimed in claim 6, wherein when the processor issues the line allocation with respect to the plurality of processing units, the processor selects a corresponding amount of resources from a service type of the line and a throughput;

the processor adds the corresponding amount of resources to the amount of resources used by a corresponding processing unit when making the line allocation;

the processor subtracts the corresponding amount of resources from the amount of resources used by the corresponding processing unit when releasing the line; and in selecting the processing unit when making the line allocation, the sum of the amount of resources used and the amount of virtual resources is used as a selecting condition, and the processing unit having the smallest sum of the amount of resources used and the amount of virtual resources at the time of the selection is selected.

* * * * *